(12) United States Patent
Kwon et al.

(10) Patent No.: US 6,430,635 B1
(45) Date of Patent: Aug. 6, 2002

(54) PROTOCOL INTERFACING METHOD

(75) Inventors: Young Ki Kwon; In Seong Hwang; Sung Hun Cho, all of Seoul; Seung Hyun Lee, Buchun; Won Seok Cho, Suwon, all of (KR)

(73) Assignee: LG Electronics Inc, Seoul (KR)

( * ) Notice: Subject to any disclaimer, the term of this patent is extended or adjusted under 35 U.S.C. 154(b) by 0 days.

(21) Appl. No.: 09/407,113

(22) Filed: Sep. 27, 1999

(30) Foreign Application Priority Data

Oct. 10, 1998 (KR) .......................................... 98-42419
Oct. 12, 1998 (KR) .......................................... 98-42527

(51) Int. Cl.$^7$ ............................................. G06F 13/00
(52) U.S. Cl. ...................... 710/104; 710/302; 709/221
(58) Field of Search ............................ 710/302, 104, 710/105, 306, 313, 314, 315, 8; 709/220, 221, 222, 223, 224, 225

(56) References Cited

U.S. PATENT DOCUMENTS 6,131,119 A * 10/2000 Fukui ........................ 709/224
6,233,611 B1 * 5/2001 Ludke et al. ................ 709/223
6,366,964 B1 * 4/2002 Shima et al. .................. 710/8

* cited by examiner

Primary Examiner—Glenn A. Auve
(74) Attorney, Agent, or Firm—Morgan, Lewis & Bockius LLP

(57) ABSTRACT

A method for performing a protocol interfacing operation for a plurality of nodes in an IEEE1394 serial bus network. Upon initialization of an IEEE1394 serial bus due to node addition or deletion, each of the nodes formats a protocol identifier packet and sends it to the other nodes. A bus manager stores the protocol identifier packets of the nodes into a protocol map. Then, a source node sends a protocol query packet including a target node identifier to the bus manager to request the transfer of data. Upon receiving the protocol query packet from the source node, the bus manager retrieves a communication protocol from the protocol map and sends a protocol set packet including information about the retrieved communication protocol to the source node and a target node to perform the transfer of data between the source and target nodes through the communication protocol. Therefore, the data transfer can efficiently be performed with no necessity for checking protocols one by one.

18 Claims, 4 Drawing Sheets

| QUERY PROTOCOL ID(11000001)$_2$ ||
|---|---|
| PHY ID | IN/OUT TYPE |
| TARGET PHY ID | ZERO PADDING |
| ZERO PADDING ||

| PROTOCOL SET ID(11000010)$_2$ ||
|---|---|
| SOURCE PHY ID | IN/OUT TYPE |
| DESTINATION PHY ID | DETERMINED PROTOCOL CODE |
| PROTOCOL CODE | ZERO PADDING |

| PROTOCOL TYPE | PROTOCOL CODE |
|---|---|
| AV/C | 0000 |
| SBP-2 | 0001 |
| DPP | 0010 |
| ⋮ | ⋮ |

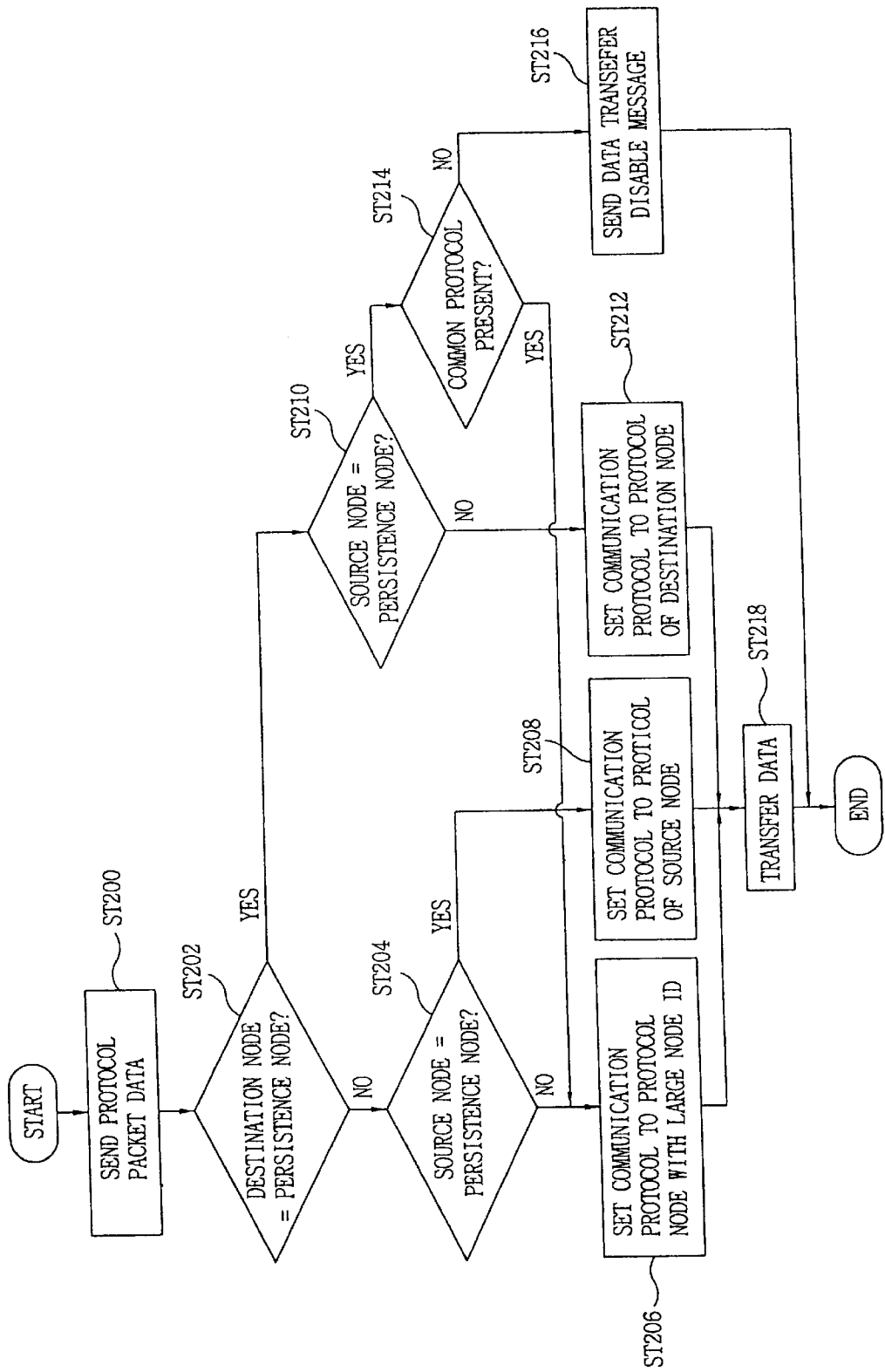

PROTOCOL INTERFACING METHOD

BACKGROUND OF THE INVENTION

1. Field of the Invention

The present invention relates in general to data transfer methods, and more particularly to a data transfer method based on inter-node protocol interfacing.

2. Description of the Prior Art

The 1394 standard was published in 1986 as a digital link standard by Apple computer technical staff and thereafter adopted as a base of the IEEE1394 standard in 1995. The IEEE1394 standard is an international standard for the implementation of a high-speed serial bus structure which is capable of supporting both isochronous (real-time) and asynchronous transfer modes. This IEEE1394 standard provides a high-speed serial bus for interconnecting digital devices, which is implemented through an IEEE1394 serial bus network interface card (module). The IEEE1394 standard also provides an interface standard for an inter-digital node transfer technique which is capable of interconnecting multimedia, such as a communication node, a computer and an electric appliance, via a single network and effecting transmission/reception of data from the multimedia at a high rate ranging from 100 Mbps to 1 Gbps.

A cable prescribed in the IEEE1394 standard is able to interface isochronous data at a high-bandwidth, and it is thinner in thickness than other cables. The IEEE1394 standard further provides a multimedia operating characteristic capable of adding a new digital node or deleting an existing digital node even when existing digital nodes connected to the IEEE1394 cable are active.

The IEEE1394 serial bus provides the excellent transfer rate and bidirectional communication performance over a universal serial bus (USB) which is being highlighted as another multimedia standard. That is, the IEEE1394 serial bus can process data at three types of transfer rates, or 98.304 Mbps, 196.608 Mbps and 393.216 Mbps, according to transfer modes to smoothly transfer digital audio or moving picture information. In this regard, the IEEE1394 serial bus is able to connect the multimedia nodes to the peripheral nodes such as a scanner, a digital camera, a digital video camera, etc. The three transfer rates are compatible with one another. For example, the 393.216 Mbps transfer mode may support both the 98.304 Mbps and 196.608 Mbps transfer modes. The excellent bidirectional communication performance of the IEEE1394 serial bus enables the peripheral devices, or nodes, each containing IEEE1394 serial bus network interface cards (modules) to transmit and receive data in a multimedia application field such as a computer-based video teleconference.

FIG. 1 shows a general IEEE1394 serial bus network with a plurality of nodes interconnected via an IEEE1394 serial bus according to the IEEE1394 standard. Each of the nodes comprises an IEEE1394 serial bus network interface card (module), not shown, for transferring output data from the associated node to a different one of the nodes to record or display it. The nodes are interconnected in a point-to-point manner through the IEEE1394 serial bus network interface cards. Namely, an audio unit 100, digital television (DTV) 102, set-top box 104, computer 106, printer 108, scanner 110 and digital video disk read only memory (DVD-ROM) drive 112 are interconnected via an IEEE1394 cable on the basis of a point-to-point bus technique.

If any one of the nodes is removed from the IEEE1394 cable or a new node is added thereto under the above condition, the IEEE1394 serial bus is reset to be initialized. In the initialization procedure, the nodes connected to the IEEE1394 cable initialize existing information and are reassigned respectively with physical addresses.

Then, an IEEE1394 interface enters a standby state for the start of a normal operation.

On the other hand, the IEEE1394 interface supports both the asynchronous transfer mode and isochronous transfer mode as mentioned above.

In the asynchronous transfer mode, data and layer information are transferred on the basis of an address. But, in the isochronous transfer mode, data is transferred on the basis of a channel number, not the address. For example, the isochronous transfer mode may be used for the transfer of multimedia information considerably restricted by time, such as moving picture or voice data, and the asynchronous transfer mode may be used for the transfer of information from devices with no need for the real-time operation, such as the printer 108 and scanner 110. Protocols are assigned respectively to the nodes to support the data transfer thereof. For example, a protocol AV/C may be applied to the audio unit 100 and DTV 102 and a protocol Serial Bus Protocol-2 (SBP-2) may be applied to the CD-ROM/DVD-ROM drive 112. Also, a protocol DP Protocol may be applied to the printer 108. These protocols are distinguished from one another according to 1-bit flags and stored in protocol packet data in the associated nodes.

Each of the nodes sends self protocol identification packet data to the network to inform the other nodes of its data transfer and performs data transmission/reception with only certain ones of the nodes with the same protocol. In this manner, the nodes are interconnected via the IEEE1394 cable and transfer data in the asynchronous transfer mode or isochronous transfer mode.

However, the data transfer is not possible between certain ones of the nodes interconnected via the IEEE1394 cable, having different protocols, because of the presence of no interface therebetween. For example, in the case where the user loads a compact disk (CD) or a video CD with data compressed according to the MPEG-2 standard into the DVD-ROM or CD-ROM drive to watch a desired picture from the CD through any other video node than a personal computer (PC), such as the digital TV, the video reproduction is not effected due to different protocols.

At present, the DVD-ROM or CD-ROM drive is operated in the PC according to a SBP-2-based protocol, whereas the digital TV is standardized to have an AV/C-based protocol.

SUMMARY OF THE INVENTION

Therefore, the present invention has been made in view of the above problem, and it is an object of the present invention to provide a data transfer method based on inter-node protocol interfacing.

In accordance with one aspect of the present invention, in an IEEE1394 serial bus network having a plurality of nodes interconnected via an IEEE1394 cable, there is provided a method for performing a protocol interfacing operation for the nodes, comprising the first step of formatting a protocol identifier packet of each of the nodes upon initializing an IEEE1394 serial bus due to node addition or deletion; the second step of sending the formatted protocol identifier packet of each of the nodes to the other nodes; the third step of storing the protocol identifier packets of the nodes into a protocol map under control of a bus manager; the fourth step of sending a protocol query packet including a target node identifier from a source node among the nodes to the bus manager to request the transfer of data; and the fifth step of retrieving a communication protocol from the protocol map and sending a protocol set packet including information about the retrieved communication protocol from the bus manager to the source node and a target node among the nodes to perform the transfer of data between the source and target nodes through the communication protocol.

In accordance with another aspect of the present invention, in an IEEE1394 serial bus network having a plurality of nodes interconnected via an IEEE1394 cable, there is provided a method for performing a protocol interfacing operation for the nodes, comprising the first step of designating a specific node as a root node upon generation of a data transfer request from a source node among the nodes; the second step of sending protocol packet data from the source node to a destination node among the nodes; the third step of retrieving protocols of the source and destination nodes to set a communication protocol; and the fourth step of, if a common protocol is present for the source and destination nodes, setting the communication protocol to the common protocol and performing the transfer of data between the source and destination nodes through the communication protocol.

BRIEF DESCRIPTION OF THE DRAWINGS

The above and other objects, features and advantages of the present invention will be more clearly understood from the following detailed description taken in conjunction with the accompanying drawings, in which:

FIG. 6 is a flowchart illustrating the operation of each node which selects a protocol for protocol interfacing in accordance with the present invention.

DETAILED DESCRIPTION OF THE PREFERRED EMBODIMENTS

Figures 1, 2A, 2B:
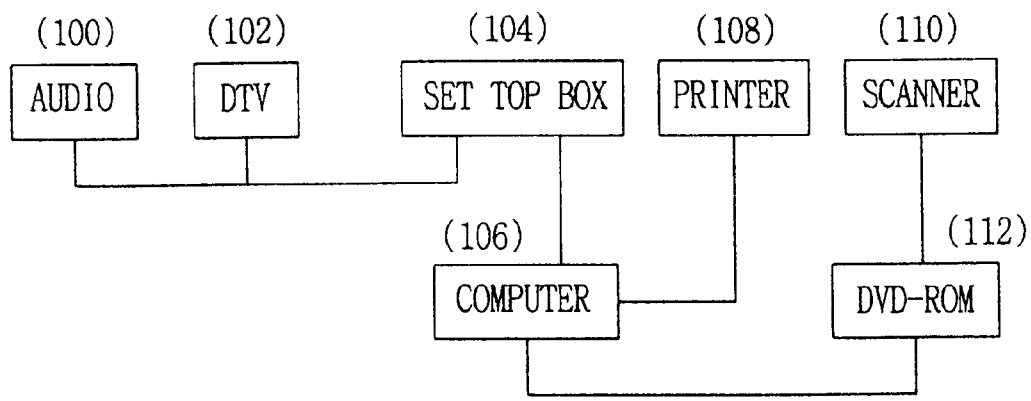
FIG. 1 is a block diagram of a general IEEE1394 serial bus network with a plurality of nodes interconnected via an IEEE1394 serial bus according to the IEEE1394 standard.
FIG. 2A is a view showing a format of a protocol query packet in accordance with the present invention.
FIG. 2B is a view showing a format of a protocol set packet in accordance with the present invention.

FIG. 2A is a view showing a format of a protocol query packet for the interfacing between different protocols in accordance with the present invention. The format of the protocol query packet is composed of an 8-bit query packet identifier (ID), $11000001_2$, a 6-bit physical address ID, PHY ID, indicative of a self node ID, 2-bit input/output mode information and a target physical address ID.

The 6-bit physical address ID, or node ID, is labeled uniquely according to a topology of the associated node at a node identification step of a bus resetting procedure.

The input/output mode information represents input/output characteristics of a system in which the associated node is located. Namely, the input/output mode information represents a nothing characteristic of the system if it is 00, an input only characteristic of the system if 01, an output only characteristic of the system if 10 and an input/output both characteristic of the system if 11. The target physical address ID is a destination node ID. The remainder of the protocol query packet is padded with 0.

FIG. 2B is a view showing a format of a protocol set packet for the interfacing between different protocols in accordance with the present invention. The protocol set packet is used by a bus manager to notify a transmitter and receiver of a determined protocol. The format of the protocol set packet is composed of an 8-bit set packet ID, $11000010_2$, a 6-bit physical address ID, PHY ID, indicative of a source node ID, 2-bit input/output mode information and a 6-bit physical address ID, PHY ID, indicative of a destination node ID. The protocol set packet further includes a determined protocol code and the remainder thereof is padded with 0. The protocol code is set with reference to a protocol code table of FIG. 3.

Protocols capable of supporting nodes are distinguished from one another according to 1-bit flags. A protocol determination method will hereinafter be described with reference to FIG. 1 as an example. Protocols capable of supporting nodes can be defined up to 16 in number. As a result, the protocol AV/C applied to the audio unit and digital TV may be defined as $1000000000000000_2$, the protocol SBP-2 applied to the CD-ROM/DVD-ROM drive may be defined as $0100000000000000_2$ and the protocol DPP applied to the printer may be defined as $0010000000000000_2$. A certain node may be supported with a plurality of protocols. For example, if both the protocols AV/C and SBP-2 are applied to one node, they may be defined as $1100000000000000_2$. That is, additional protocols can be distinguished and stored according to 1-bit flags.

Figures 3, 4:
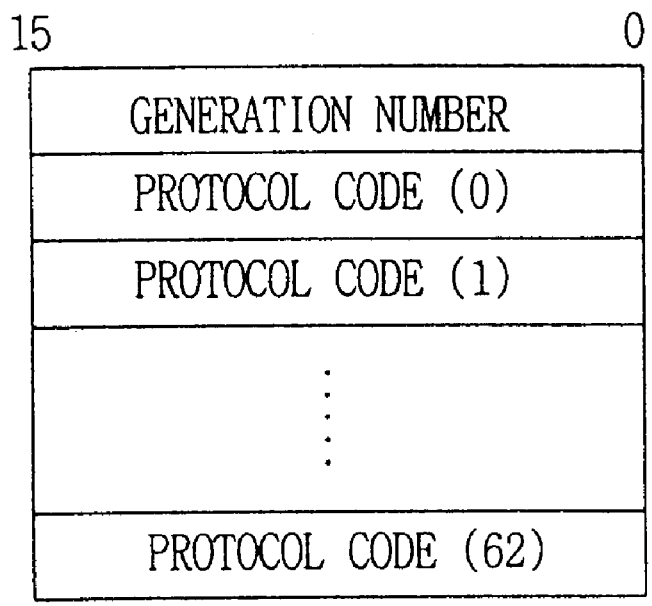
FIG. 3 is a table illustrating protocol code values in accordance with the present invention.
FIG. 4 is a view showing a format of a protocol map which stores protocol information.

FIG. 4 shows a protocol map where protocols capable of supporting nodes connected to an IEEE1394 cable are coded and defined, and node IDs are coded in the unit of 16 bits and represented up to 63 (0–62) in number.

Now, a description will be given of the operation of interfacing between the nodes connected to the IEEE1394 cable under the condition that the protocol packets and protocol map are defined as mentioned above.

First, a plurality of nodes are connected to the IEEE1394 cable capable of accommodating all IEEE1394 transfer modes. At this time, the IEEE1394 interface can connect the maximum 63 surrounding nodes to one bridge. The IEEE1394 interface has a plug and play function and a hot plug function, thereby resetting the IEEE1394 bus upon the addition or deletion of a node under the condition that the above nodes are connected to the IEEE1394 cable.

In the case where the IEEE1394 bus is reset, each of the nodes connected to the IEEE1394 cable reformats a self protocol ID packet and sends it to the other nodes on the network.

If the nodes notify their self protocol ID packets, then a bus manager stores the notified protocol ID packets into a protocol map to utilize them for the control of future data transfer. For example, if a certain node connected to the IEEE1394 cable may be supported with various types of protocols such as AV/C, SBP-2 and DPP and utilize the supported protocols for the data transfer, all available protocols must be coded and stored.

In this regard, if the protocol ID packets of the nodes are sent to the network, then they are formatted and stored into the protocol map as shown in FIG. 4 by a specific bus manager (not shown).

The bus manager manages channel numbers and transfer bandwidths of the nodes to establish the isochronous transfer mode among the IEEE1394 transfer modes. In the case where a certain node is to transfer data, it sends a protocol query packet containing a target node ID to the bus manager to make inquiries about a communication protocol. Then, the bus manager retrieves and selects a protocol executable by the above node from the protocol map.

For example, in the case where the DTV 102 in FIG. 1 requests the data transfer to the DVD-ROM drive 112, the bus manager retrieves the protocol SBP-2 from the protocol map and notifies the DTV 102 of the retrieved protocol so that it can select the same protocol. Unless these two nodes are supported with the same protocol, they perform the data transfer according to an asynchronous packet interface of a transaction layer in an OSI reference model layered structure.

Figure 5:
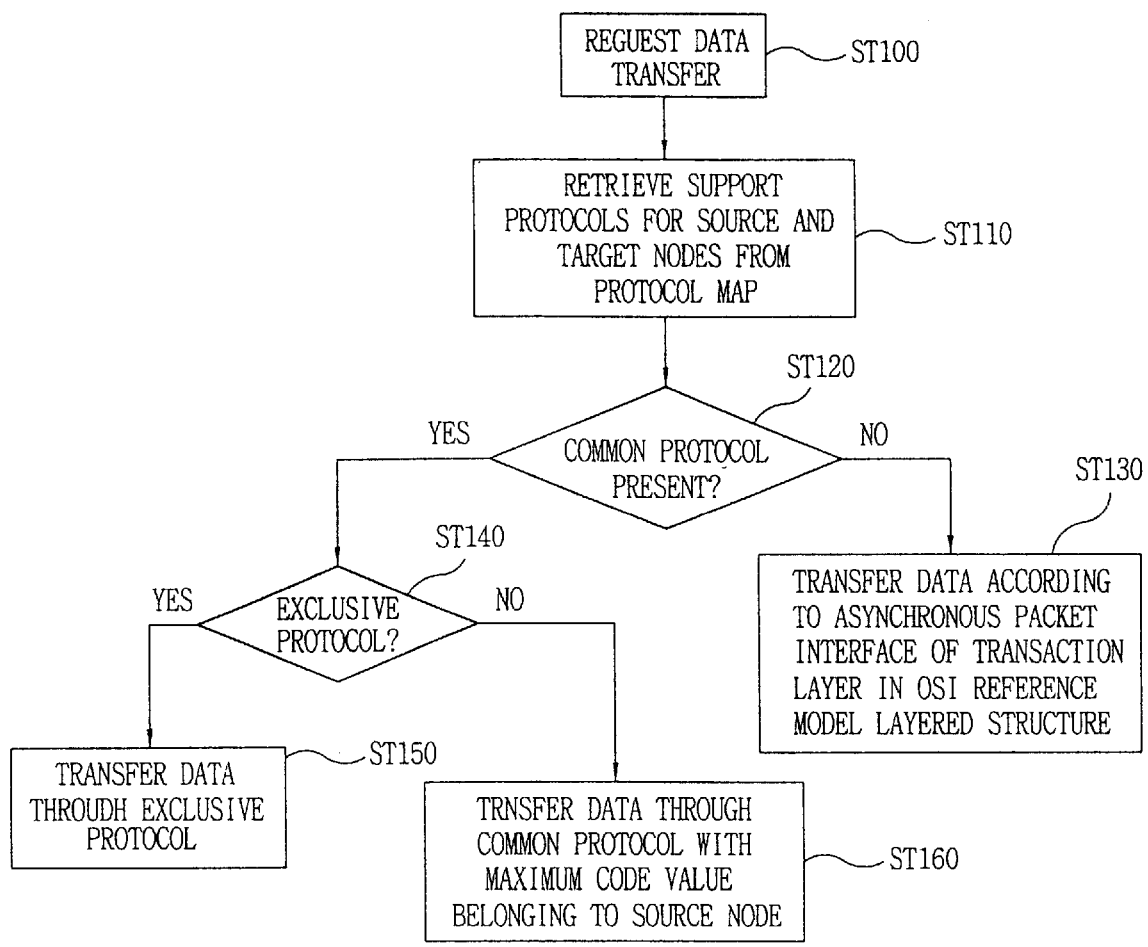
FIG. 5 is a flowchart illustrating the operation of a bus manager which selects a protocol using the protocol map for protocol interfacing in accordance with the present invention.

The above protocol selection operation of the bus manager will hereinafter be described in more detail with reference to a flowchart of FIG. 5.

First, a certain node on the network sends a protocol query packet to a node in which the bus manager is located, at step st100. Upon receiving the protocol query packet from the source node, the bus manager retrieves support protocols for the source and target (destination) nodes from the protocol map at step st110 to determine at step st120 whether a common protocol is present among the support protocols. If it is determined at step st120 that no common protocol is present among the support protocols, the bus manager performs the transfer of data between the source and target nodes according to the asynchronous packet interface of the transaction layer in the OSI reference model layered structure at step st130. However, in the case where a common protocol is determined to be present among the support protocols as a result of the retrieval, the bus manager determines at step st140 whether the common protocol is exclusive. If the common protocol is determined to be exclusive, then it is selected for the data transfer between the source and target nodes at step st150. However, in the case where the common protocol is determined to be not exclusive, but two or more in number, the bus manager selects one with the maximum code value belonging to the source node among the two or more common protocols at step st160. Then, the bus manager sends a protocol set packet, especially produced according to the present invention, to the source and target nodes to inform them of the selected protocol. The sent protocol set packet contains a destination node ID and communication protocol information.

For example, assume that the DVD-ROM drive 112 is to transfer data to the DTV 102 to reproduce it through the DTV 102. First, the DVD-ROM drive node sends a protocol query packet to the bus manager to make inquiries about a communication protocol. The bus manager retrieves support protocols for the DVD-ROM drive 112 and DTV 102 from the protocol map preset after the bus resetting. In the case where the data transfer between the source and destination nodes is possible by at least two support protocols, the bus manager selects one with the maximum code value belonging to the source node among the at least two support protocols and determines the selected protocol as a communication protocol, However, in the case where the DVD-ROM drive node is able to transfer data through only a specific protocol provided therein, the bus manager determines the specific protocol as a communication protocol and sends the resultant protocol set packet to the DVD-ROM drive and DTV nodes to inform them of the determined communication protocol. As a result, the transfer of data between the DVD-ROM drive and DTV nodes is executed on the basis of the determined communication protocol.

In other words, in order for the user to watch a desired picture from the DVD-ROM drive installed in the personal computer through the DTV, the bus manager can automatically control a communication protocol because it previously recognizes support protocols for the DVD-ROM drive and DTV on the basis of the protocol map.

On the other hand, alternatively, the inter-node data transfer may be effected not under the retrieval/control of the bus manager, but under the retrieval/process of each node.

The second embodiment will hereinafter be mentioned with reference to the nodes described in the first embodiment based on the bus manager.

FIG. 6 is a flowchart illustrating the inter-node data transfer in accordance with the second embodiment of the present invention. In the second embodiment, any one of the nodes is designated as a root node. The root designation is established by assigning a priority for root qualification to a specific node in consideration of cycle master possibility and bus master possibility. If the root designation is completed, then a node identification step is performed in which each of the nodes sends a self ID to the other nodes. Upon receiving a protocol ID packet from a source node, a destination node checks the received protocol ID packet and determines according to the checked result whether a common protocol is present for the source and destination nodes. If the common protocol is determined to be present, then it is selected for the transfer of data between the source and destination nodes.

The above protocol selection operation of each node will hereinafter be described in more detail with reference to the flowchart of FIG. 6 as an example.

First, any one of a plurality of nodes connected to the IEEE1394 cable generates a data transfer request. The node generating the data transfer request, or source node, sends a protocol ID packet to a target node, or destination node, at step ST200. Upon receiving the protocol ID packet from the source node, the destination node retrieves a supportable protocol from a protocol map. Then, it is determined at step ST202 whether the destination node is a node transferring data through only a protocol provided therein (referred to hereinafter as persistence node). Irrespective of the determination about whether the destination node is a persistence node, it is determined at steps ST204 and ST210 whether the source node is a persistence node. If the destination node is not a persistence node at step ST202 and the source node is not a persistence node at step ST204, a communication protocol is set to a protocol provided in any one of the source and destination nodes with a larger one of the node IDs labeled according to the topology at the node identification step at step ST206. In the case where the source node is a persistence node at step ST204, a communication protocol is set to a protocol provided in the source node at step ST208. If the destination node is a persistence node at step ST202 and the source node is not a persistence node at step ST210, a communication protocol is set to a protocol provided in the destination node at step ST212. However, in the case where the destination node is a persistence node at step ST202 and the source node is a persistence node at step ST210, it is determined at step ST214 whether common protocols are present among protocols supporting the source and destination nodes. If the common protocols are determined to be present, a communication protocol is set to any one of the common protocols belonging to any one of the source and destination nodes with the larger node ID at step ST206. When no common protocol is present, a data transfer disable message is sent at step ST216.

If a communication protocol is set at the above step ST206, ST208 or ST212, then the transfer of data between the source and destination nodes is executed through the set communication protocol at step ST218.

As apparent from the above description, according to the present invention, the user can watch a desired picture from the DVD-ROM drive or CD-ROM drive through any other video node than the personal computer, such as the digital TV, so far as the nodes contain IEEE1394 serial bus network interface cards, respectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In an IEEE1394 serial bus network having a plurality of nodes interconnected via an IEEE1394 cable, a method for performing a protocol interfacing operation for said nodes, comprising the steps of:
    a) formatting a protocol identifier packet of each of said nodes upon initializing an IEEE1394 serial bus due to node addition or deletion;
    b) sending the formatted protocol identifier packet of each of said nodes to the other nodes;
    c) storing said protocol identifier packets of said nodes into a protocol map under control of a bus manager;
    d) sending a protocol query packet including a target node identifier from a source node among said nodes to said bus manager to request the transfer of data; and
    e) retrieving a communication protocol from said protocol map and sending a protocol set packet including information about the retrieved communication protocol from said bus manager to said source node and a target node among said nodes to perform the transfer of data between said source and target nodes through said communication protocol.

2. The method as set forth in claim 1, wherein said nodes are at least two in number.

3. The method as set forth in claim 1, wherein said protocol query packet further includes input/output mode information for representing input/output modes of said source node, said input/output mode information being of two bits.

4. The method as set forth in claim 1, wherein said protocol set packet further includes physical identifiers of said source and target nodes.

5. The method as set forth in claim 1, wherein said protocol set packet further includes input/output mode information for representing input/output modes of said source and target nodes, said input/output mode information being of two bits.

6. The method as set forth in claim 1, wherein said communication protocol information included in said protocol set packet is a protocol code.

7. The method as set forth in claim 1, wherein said step e) includes the step of retrieving a common protocol among protocols supporting said source and target nodes.

8. The method as set forth in claim 1, wherein said protocol map stores physical identifiers of up to 63 in number.

9. The method as set forth in claim 1, wherein said step e) includes the step of retrieving a common protocol among protocols supporting said source and target nodes, determining whether the retrieved common protocol is exclusive and selecting said common protocol as said communication protocol if it is exclusive.

10. The method as set forth in claim 1, wherein said step e) includes the step of retrieving common protocols among protocols supporting said source and target nodes, determining whether the retrieved common protocols are two or more in number and, if the retrieved common protocols are two or more in number, selecting, as said communication protocol, one with the maximum code value belonging to said source node among the two or more common protocols.

11. The method as set forth in claim 1, wherein said step e) includes the step of retrieving a common protocol among protocols supporting said source and target nodes and performing the data transfer between said source and target nodes according to an asynchronous packet interface of a transaction layer in an OSI reference model layered structure if no common protocol is retrieved.

12. In an IEEE1394 serial bus network having a plurality of nodes interconnected via an IEEE1394 cable, a method for performing a protocol interfacing operation for said nodes, comprising the steps of:
    a) designating a specific node as a root node upon generation of a data transfer request from a source node among said nodes;
    b) sending protocol packet data from said source node to a destination node among said nodes;
    c) retrieving protocols of said source and destination nodes to set a communication protocol; and
    d) if a common protocol is present for said source and destination nodes, setting said communication protocol to said common protocol and performing the transfer of data between said source and destination nodes through said communication protocol.

13. The method as set forth in claim 12, wherein said specific node is any one of said nodes.

14. The method as set forth in claim 12, wherein said step c) includes the step of setting said communication protocol to a protocol of any one of said source and destination nodes with a larger physical identifier if neither of said source and destination nodes is a persistence node.

15. The method as set forth in claim 12, wherein said step c) includes the step of setting said communication protocol to a protocol of said source node if said destination node is not a persistence node and said source node is a persistence node.

16. The method as set forth in claim 12, wherein said step c) includes the step of determining whether common protocols are present among said protocols of said source and destination nodes, if both said source and destination nodes are persistence nodes.

17. The method as set forth in claim 12, wherein said step c) includes the step of, if common protocols are present among said protocols of said source and destination nodes, setting said communication protocol to any one of said common protocols belonging to any one of said source and destination nodes with a larger physical identifier.

18. The method as set forth in claim 12, wherein said step c) includes the step of setting said communication protocol to a protocol of said destination node if said destination node is a persistence node and said source node is not a persistence node.

* * * * *